July 10, 1923.
L. O. SUDDERBERG
DAMPER CONTROL
Filed April 17, 1922
1,461,231
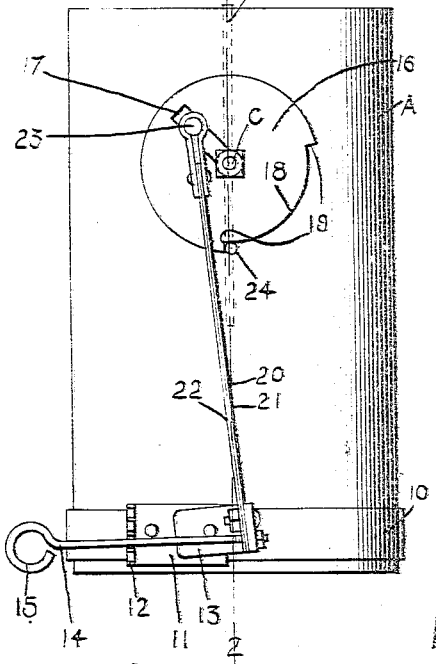
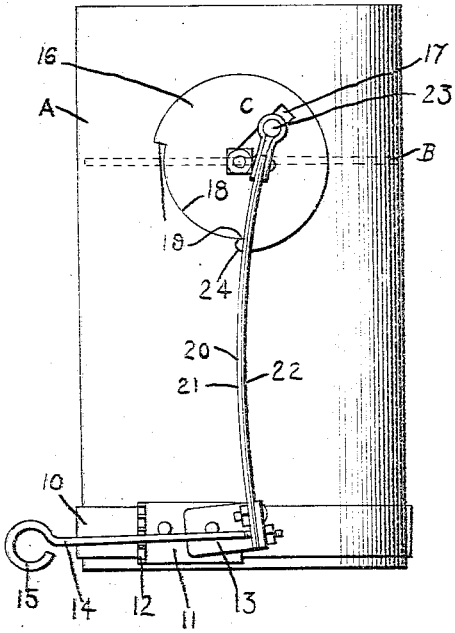
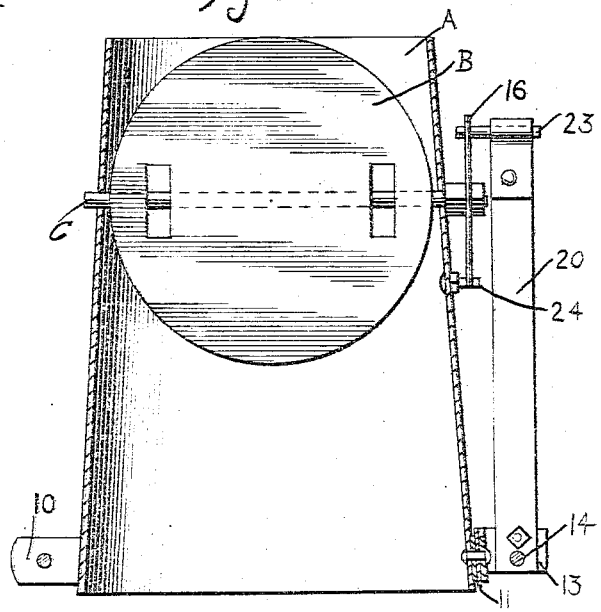
Lewis O. Sudderberg
INVENTOR Patented July 10, 1923.

1,461,231

UNITED STATES PATENT OFFICE.

LEWIS O. SUDDERBERG, OF STRATFORD, IOWA.

DAMPER CONTROL.

Application filed April 17, 1922. Serial No. 553,355.

*To all whom it may concern:*

Be it known that I, LEWIS O. SUDDERBERG, a citizen of the United States, residing at Stratford, in the county of Hamilton and State of Iowa, have invented new and useful Improvements in Damper Controls, of which the following is a specification.

This invention relates to heating devices, particularly to damper controls, and has for its object the provision of a novel thermostatic device associated with and automatically operating to control a damper located within a heating pipe whereby the flow of hot air through the pipe will be regulated at all times and without any attention whatever from an operator.

An important object is the provision of a device of this character which will be simple and inexpensive in manufacture, highly efficient in use, easy to install, durable in service and a general improvement in the art.

With the above and other objects and advantages in view, the invention consists in the details of construction to be hereinafter more fully described and claimed, and illustrated in the accompanying drawings, in which:

Figure 1 is a side elevation of a pipe having my control device associated therewith and showing it at one limit of its movement.

Figure 2 is a similar view showing the device at the other limit of its movement and Figure 3 is a longitudinal section through the pipe showing my device in side elevation.

Referring more particularly to the drawings, the letter A designates a heating pipe within which is located a damper B mounted upon a rod C which projects through the pipe diametrically thereof.

In carrying out my invention I provide a strip or collar 10 which is clamped upon the pipe and upon which is secured a bracket 11 having a notched flange 12. Pivoted upon the bracket 11 is a second bracket 13 carrying a spring rod 14 engageable within a selected one of the notches in the flange 12. The rod 14 is formed with a handle loop 15. This particular mounting of the bracket permits ready adjustment to meet various conditions.

Secured upon one projecting end of the damper rod C is a disk 16 which is formed with a radial slot 17 and which has its periphery partly cut away as shown at 18 to define stop shoulders 19.

Pivoted upon the bracket 13 is a thermostatic element 20 which consists of a strip of brass 21 and a strip of steel 22 secured together in the usual manner. It is however to be understood that other metals might be used provided that they have different coefficients of expansion. Carried by the free end of this thermostatic element is a pin 23 which extends through the slot 17 in the disk. Projecting from the pipe is a stop 24 or other projection adapted to be engaged by the shoulders 19 for limiting the turning movement of the disk and the damper.

In the operation of the device it will be seen that under normal conditions the disk will be at one limit of its rotatable movement with one shoulder 19 engaging the stop 24. When the temperature within the pipe or adjacent the pipe exceeds a certain predetermined degree the difference in the expansion of the dissimilar metals constituting the thermostatic couple will cause the element 20 to buckle or bow and this will result in partial rotation of the disk 16 owing to the engagement of the pin 23 within the slot 17. As the disk is secured with respect to the damper, the damper will be correspondingly moved so as to partially cut off the flow of heated air. Upon cooling, the bowing will cease and the parts will return, or tend to return to normal position. In this way it will be seen that there is an automatic control which will insure an even heating action without any personal attention from an operator. When it is desired to render the thermostatic device inactive it is merely necessary to swing the element 20 upon its pivot so as to withdraw the pin 23 from engagement with the slot 17. It is to be observed that the bracket 13 carrying the thermostatic device may be adjusted by the spring rod and notched flange to vary the position of the disk and thereby regulate the sensitiveness.

From the foregoing description and a study of the drawings it will be apparent that I have thus provided a simply constructed and easily installed automatic thermostatic control device which will efficiently operate to regulate the temperature without attention. Owing to the simplicity of the construction and the fewness of the parts it is apparent that there is nothing to get out of order and that the device should have a long life and satisfactory perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claims.

Having thus described the invention, I claim:

1. In combination with a damper pivoted within a heating pipe, a thermostatic control comprising a disk secured upon the pivot of the damper and formed with a slot, a thermostatic element of dissimilar metals having one end mounted upon the pipe and having its other end carrying a pin engaged within said slot, said thermostatic element being pivoted with respect to the pipe whereby it may be swung to withdraw the pin from the slot.

2. In combination with a damper pivoted within a heating pipe, a thermostatic control comprising a disk secured upon the pivot of the damper and formed with a slot, a thermostatic element of dissimilar metals having one end mounted upon the pipe and having its other end carrying a pin engaged within said slot, the periphery of said disk being partially cutaway to define stop shoulders, and a stop element projecting from the pipe in position to be engaged by said shoulders for limiting rotary movement of the disk.

3. In combination with a damper pivoted within a heating pipe, a thermostatic control comprising a disk secured upon the pivot of the damper and formed with a slot, a support carried by the pipe, a bracket pivotally mounted upon the support, a thermostatic element consisting of dissimilar metals having one end secured to said bracket and its other end carrying a projection engaged within said slot, and means for adjusting the position of said bracket, consisting of a rod carried by the bracket, and a notched plate carried by the support and within any notch of which said rod may be engaged.

In testimony whereof I affix my signature.

LEWIS O. SUDDERBERG.